United States Patent
Basu et al.

(10) Patent No.: US 9,286,115 B2
(45) Date of Patent: Mar. 15, 2016

(54) PERFORMANT RUNTIME PAUSE WITH NO CPU UTILIZATION

(75) Inventors: Abhinaba Basu, Redmond, WA (US); Jan Kotas, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 142 days.

(21) Appl. No.: 13/528,870

(22) Filed: Jun. 21, 2012

(65) Prior Publication Data

US 2013/0347002 A1    Dec. 26, 2013

(51) Int. Cl.
*G06F 9/48* (2006.01)

(52) U.S. Cl.
CPC ................................. *G06F 9/485* (2013.01)

(58) Field of Classification Search
None
See application file for complete search history.

(56) References Cited

U.S. PATENT DOCUMENTS

| | | | |
|---|---|---|---|
| 6,560,626 B1 * | 5/2003 | Hogle et al. ................. | 718/102 |
| 6,874,145 B1 | 3/2005 | Ye et al. | |
| 6,952,825 B1 * | 10/2005 | Cockx ....................... | G06F 8/20 717/104 |
| 7,529,923 B2 | 5/2009 | Chartrand et al. | |
| 7,765,553 B2 * | 7/2010 | Douceur et al. .............. | 718/107 |
| 2002/0174265 A1 * | 11/2002 | Schmidt .................. | G06F 9/485 719/328 |
| 2008/0200154 A1 | 8/2008 | Maharajh et al. | |
| 2008/0244586 A1 * | 10/2008 | Hopp .................. | G06F 17/2247 718/102 |
| 2009/0077564 A1 | 3/2009 | Loeser | |
| 2009/0144712 A1 * | 6/2009 | Steensgaard et al. ......... | 717/154 |
| 2010/0223600 A1 | 9/2010 | Shafi et al. | |
| 2013/0097606 A1 * | 4/2013 | Coombe ............... | G06F 9/4887 718/102 |
| 2013/0225145 A1 * | 8/2013 | Cherian et al. ................ | 455/418 |

OTHER PUBLICATIONS

"App Stop description", Retrieved at <<http://mac.softpedia.com/get/Utilities/App-Stop.shtml>>, Dec. 11, 2006, pp. 02.
Ant, "Pause a process in OS X to temporarily free system resources", Retrieved at <<http://www.macyourself.com/2011/02/20/pause-a-process-in-os-x-to-temporarily-free-system-resources/>>, Feb. 20, 2011, pp. 05.

* cited by examiner

*Primary Examiner* — Emerson Puente
*Assistant Examiner* — Zhi Chen
(74) *Attorney, Agent, or Firm* — Kevin Sullivan; Kate Drakos; Micky Minhas

(57) ABSTRACT

Some computing devices have limited resources such as, for example, battery power. When a user ceases to interact with an application, execution of the application can be moved to background and the application can be paused. During the time period in which the application is paused, the application consumes no CPU cycles because executing managed threads of the paused application are stopped, and native threads are prevented from running using asynchronous procedure calls.

20 Claims, 5 Drawing Sheets

PERFORMANT RUNTIME PAUSE WITH NO CPU UTILIZATION

BACKGROUND

When a user executes applications on a desktop computer, multiple applications can typically execute simultaneously without adversely affecting performance. In a device that has limited resources multiple applications running at the same time can quickly deplete resources such as battery power. Often output from multiple applications cannot be displayed simultaneously because of a small display area. Consequently, on these types of devices, sometimes a first application is paused, ended, or is run in the background when the user switches to a second application. However, if the user switches back to the first application, prompt resumption of the first application is often expected.

SUMMARY

A paused application utilizes minimal resources, but when the application is resumed, it becomes responsive quickly because the application is still loaded in memory. It resumes at the point at which it was paused because application state at the time of pausing is saved. In response to lack of user interaction, an application may be transferred from foreground. to background and paused. When an application is paused, the application code stops executing and the application consumes no (zero) CPU (central processing unit) cycles. When the application is paused, functions such as sleep and wait do not timeout and cause a context switch that changes the CPU from a low-power state to a high-power state. When the application is not paused, there is no overhead caused by the 0 CPU usage pause feature. That is, no additional resources are consumed if the application is never paused. When the paused application is resumed, it starts up quickly in foreground at the point at which it was paused.

After a pause is signaled, the application state can be saved to a permanent store (e.g., in isolated storage). After the paused state is reached, no managed code for the application executes, either in foreground or in background. All executing managed threads of the application are stopped essentially simultaneously. All threads belonging to the application that are in a wait or sleep state are prevented from starting up again.

The program execution manager does not have to selectively pause threads or differentiate between types of threads (e.g., foreground and background threads). It does not have to be aware of and implement execution policies associated with the threads. Deadlocks caused by, for example, a foreground thread waiting for a lock acquired by the paused background thread, are avoided. Each code module does not have to audit code and handle every wait or sleep function on a case by case basis.

None of the waits or handles employed by the user code pay any additional cost to pause and resume an application. That is, there is no additional overhead to support an application pause. If an application is never paused, no cost in terms of CPU usage or other resources is accrued. No CPU cycles are consumed by a paused application because operating system level asynchronous procedure calls are used so that waits and sleep functions in the application threads do not activate until the application is resumed (e.g., a user switches back to the application that was paused).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1A:
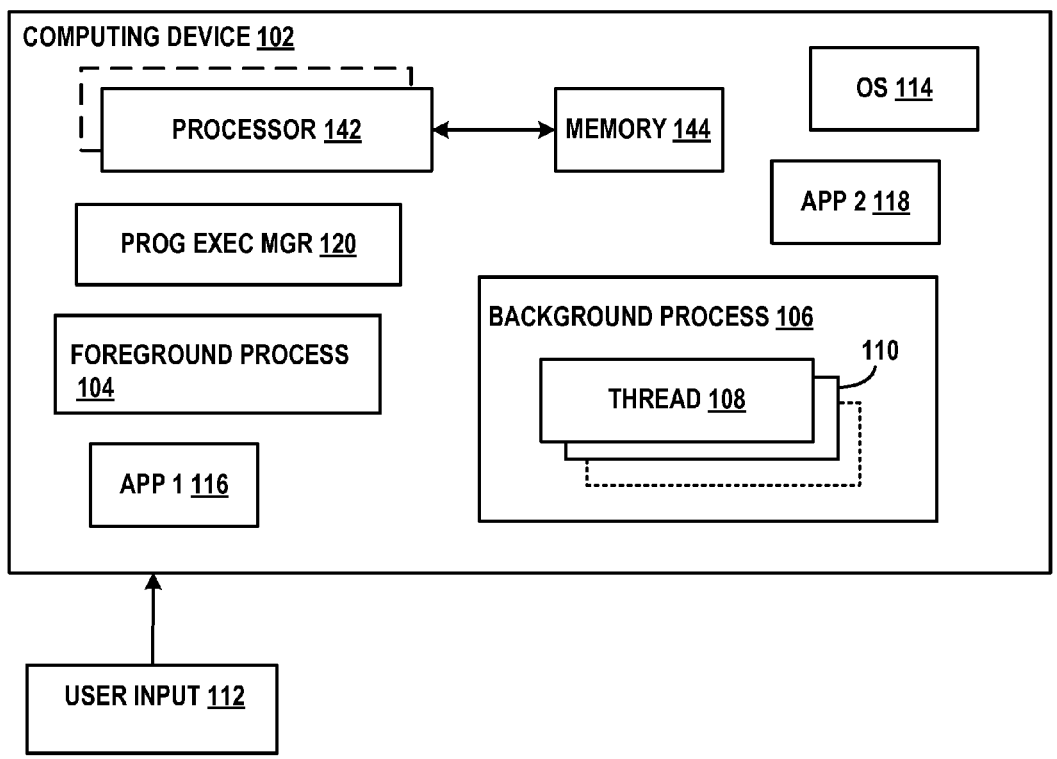
FIG. 1a illustrates an example of a system 100 that utilizes no CPU cycles when an application is paused in accordance with aspects of the subject matter disclosed herein.

Some known solutions for handling the running of multiple applications on limited-resource devices provide 0 CPU usage when an application is paused but consume additional resources to implement the feature. For example, one way to deliver 0 CPU usage when an application is paused is to create a global flag to indicate that the runtime is requesting a pause. If the flag is set, the code branches to a central function that handles the pause operation (and later handles the resume operation). Operating system primitives can be used to support calls to wait functions including but not limited to sleep functions, functions that wait on a handle, timeouts and timers with specified durations. However, the actual wait is not under the control of the runtime. For example, suppose an application calls a sleep function and requests a sleep for 7 seconds. The program execution manager can forward that call to an application programming interface. Suppose after 4 seconds, the application is paused, causing all the managed threads to be paused. After another 3 seconds the OS sleep function expires and the associated thread returns, utilizing the CPU and causing a CPU usage spike until the native code to managed code transition is blocked by the program execution manager.

To avoid a CPU spike, a global pausing event can be created at device startup. A timeout implemented by calling a sleep function can be replaced by a timeout that is implemented by waiting for a pausing event handle. When a pausing event is signaled, all the waits can be ended and can be made to wait on a resume event which is only signaled at a resuming stage. A consequence of this approach is that all waits have the overhead described above. This can use extra resources all the time even though the pause and resume condition is typically relatively rare.

In accordance with aspects of the subject matter described herein, when a pausing operation is commenced, a global resume event that acts on all the threads of the paused application can be created in an unsignaled state. During pausing the program execution manager stops all executing managed threads, (i.e., threads of the paused application which are not in a wait state). In accordance with some aspects of the subject matter described herein, the executing managed threads can be stopped at safe points by using redirection or hijacking.

Garbage collection information can be used to find safe points in the managed code to stop execution. The program execution manager can suspend threads and determine which instruction is executing. If the current execution instruction is at a safe point the thread can remain suspended. If the thread is not currently at a safe point then the thread can be hijacked by overwriting the return address of the thread so that when the method completes (a definite safe point) instead of returning to the caller, the method calls into a holding function.

In accordance with some aspects of the subject matter disclosed herein, all of managed timers can be supported by a single multiplexed central native (OS) timer. The pause can be implemented by releasing or stopping the central timer, ensuring that after the pausing of the application, none of the managed timers that rely on the central timer fire. When the application is resumed, the central timer can be re-created. Whenever a wait or sleep function is requested by a thread of an unpaused application running in foreground, a flag can be set in that thread's state, indicating that the application is in a wait or sleep state, placing the thread in an alertable state. When the application is paused, the program execution manager can iterate through all the currently stopped threads looking for the flag. For all threads for which the flag is set, an asynchronous procedure call (e.g., PauseAPC or the like) can be queued to the waiting thread. In response, the operating system wakes the waiting thread and makes the thread call into the queued APC function. The APC function can be blocked until the application is resumed.

When the application is resumed (e.g., triggered by a user switching back to the paused application) a global resume event can be set to a signaled state, causing managed threads of the paused application to be restalled. Consequently, waiting threads return to waiting for their associated handles. Timer timeouts can be adjusted. A central timer object can be created so that the managed timers are able to fire. Results of the above approach can include the following:

If an application is not paused during a given wait or sleep no additional resources (CPU cycles or handles) are ever utilized.

There is no change in application semantics. For example, a sleep function remains a sleep function: it is not converted into a wait function. Similarly wait functions are not converted into different types of wait functions.

Using this approach a function that returns when all the associated handles have been signaled (e.g., WaitAll) is natively supported.

The number of available handles that wait functions can use is not reduced.

Performant Runtime Pause With No CPU Utilization

FIG. 1a illustrates a block diagram of a system 100 that uses no CPU cycles when an application is paused in accordance with aspects of the subject matter disclosed herein. All or portions of system 100 may reside on one or more computers or computing devices such as the computers described below with respect to FIG. 3. System 100 or portions thereof may be provided as a stand-alone system or as a plug-in or add-in. System 100 may execute in whole or in part on a software development computer such as the software development computer described with respect to FIG. 4. All or portions of system 100 may execute within an integrated development environment (IDE) described more fully with respect to FIG. 4 or can execute outside an IDE.

System 100 can include a computer or computing device such as computing device 102. Computing device 1102 can be any computer or computing device including a mobile device, a mobile communication device, a smartphone, a tablet, a desktop computer, a game box or any other kind of computing device. Computing device 102 may have limited resources such as but not limited to limited battery power, small form factor and/or small screen size. Computing device 102 can include one or more processors such as processor 142, etc., a memory such as memory 144, a program execution manager such as program execution manager 120 (e.g., Common Language Runtime or CLR or other virtual machine environment) and an operating system that supports asynchronous procedure calls such as operating system 114.

A foreground process such as foreground process 104 running a first application such as application 1 116 can be running on computing device 102. A background process such as background process 106 can be running on computing device 102. One or more threads (not shown) can be running in the foreground process 104. One or more threads such as thread 108, thread 110, etc, can be running in the background process 106. Thread 108, thread 110, etc. can be executing or can be in a wait or sleep state. User input 112 can initiate an application such as application 2 118. Application 1 116 and application 2 118 can be the same application. In response to a lack of user interaction with the application, execution of an application such as application 1 116 or application 2 118 can be transferred from the foreground to the background. Examples of when an application running in foreground is sent to the background include but are not limited to: when the device is not being used and locks, when a user explicitly launches a second application using the device's hardware button or user interface controls, when a notification is received by the device (e.g., receiving a call) or when a file is uploaded and so on.

Figure 1B:
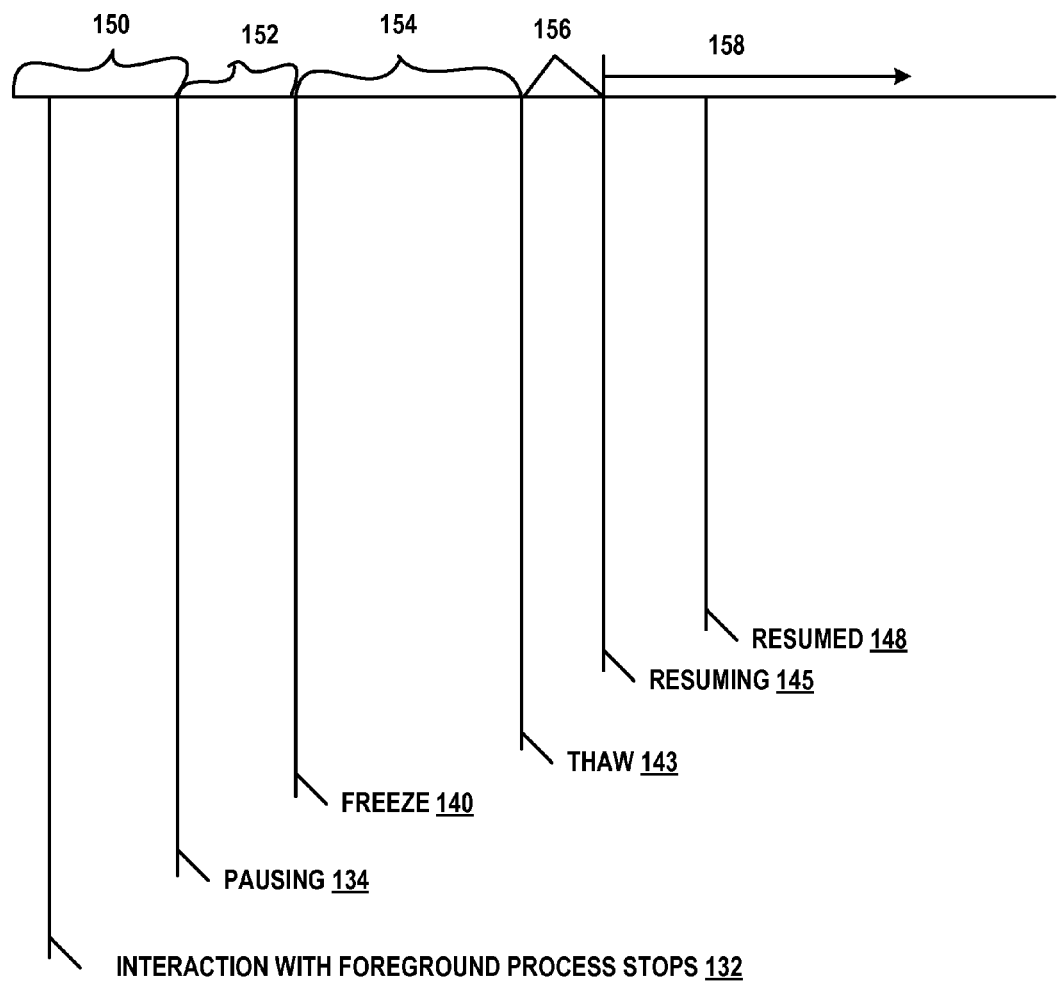
FIG. 1b illustrates an example 105 of stages of application pause and resume operations in accordance with aspects of the subject matter disclosed herein.

FIG. 1b illustrates an example 105 of stages of application pause and resume operations. It will be appreciated that although described in the context of stages and events, any mechanism accomplishing the described series of operation is contemplated. The stages of a pause application operation can include pausing 134, and freeze 140. When an application has been paused, a global static flag indicating that the application has been paused can be created. This flag can be used to ensure that no waits time-out. A global resume event can be set to the unsignaled state. A native (operating system) timer that drives the managed timers can be created. At freeze 140 all managed threads running in background (e.g., thread 108, thread 110, etc.) can be stopped. The time at which the start of pause occurred can be recorded.

During the time period 150 that extends before a point in time at which user interaction with the foreground process stops 132 and a point in time at which the application is paused, managed code can execute (e.g., threads of the application can run). During the time period 152 that extends between the point at which an application is paused in response to execution of a pausing handler, pausing 134 and the point at which the background threads are frozen, freeze 140, the program execution manager 120 may guarantee that actions that are waiting for timers to expire are not performed. During the time period 152 between when a pausing handler is executed and the application is frozen, each time a handle times out it checks to see the state of a flag that indicates that the application is paused, and if the flag is set the application stays paused until a resume event is signaled. The resume event can be implemented using a wait function that waits for a single handle and has an infinite timeout duration. Thus any timeout that occurs after the pause stage and before the resuming stage does not return to user code.

During the time period 154 that extends between the point at which the threads are frozen, freeze 140 and a point at which a thaw 143 occurs, no CPU utilization occurs. All managed execution is stopped. Currently running managed threads can be brought to a safe point and stopped. All native code that tries to return to managed code can be blocked. However, wait functions and sleep functions called by the application can timeout during this time period. Once the native handle times-out and tries to return to the managed code that started the function, the function can be blocked so that until the application is resumed user code is not executed.

The stages of a resume application operation can include thaw 143, resuming 145 and resumed 148. At thaw 143 managed code can start executing and all background threads that were not blocked start to execute again. All threads that called wait functions that timed out in between a pausing event 134 and freeze 140 can continue to be blocked. All timeouts that would have occurred after freeze 140 have been brought to a wait state using the queued APC function (e.g., PauseAPC or the like) and are blocked. When the resume event is signaled or set in resuming 145, these waits can be restarted with their remaining times adjusted to account for the Pause duration. The domain-specific (application-specific) native timer that drives all the managed timers can be re-started.

Native handles corresponding to the manage code handles can timeout during the time period 154 if native events are not explicitly stopped. This context switch uses CPU cycles, although the utilization can be low if the code is immediately blocked. Using Asynchronous Procedure Calls (APCs) prevents this CPU usage. An asynchronous procedure call (APC) is a function that executes asynchronously in the context of a particular thread. When APC is queued to a thread, the operating system issues a software interrupt. The next time the thread is scheduled, the thread will run the APC function. An APC generated by the system is called a kernel-mode APC. An APC generated by an application is called a user-mode PC. A thread has to be in an alertable state to run a user-mode APC.

Each thread has its own APC queue. An application queues an APC to a thread by calling an APC queueing function. The calling thread specifies the address of an APC function in the call. The queuing of an APC is a request for the thread to call the APC function. When a user-mode APC is queued, the thread to which it is queued is not directed to call the APC function unless the thread is in an alertable state. If the wait is satisfied before the APC is queued, the thread is no longer in an alertable wait state so the APC function will not be executed. However, the APC is still queued, so the APC function will be executed when the thread calls another alertable wait function. It will be appreciated that different operating systems such as Linux, Android, etc. may employ mechanisms similar to the APC function described herein. It will be appreciated that use of any function analogous to the APC function described herein is contemplated.

As the program execution manager loops through managed threads to pause the threads, the program execution manager also can check to see if the thread is alertable. If so, the program execution manager can queue an APC to the thread. The thread can come out of its wait state and can start executing the APC function in the context of that thread. The APC function "blocks on the global resuming event". That is, handles do not fire during freeze 140 and all threads waiting on handles and sleep functions do not activate until the resuming stage when the resuming event is signaled.

In accordance with some aspects of the subject matter disclosed herein, all the managed timers can use a single central native timer to drive the timers. When the application is paused, the central timer object can be deleted so that waiting threads cannot start to run again. The single central native timer can be re-created in resumed 148, thus using no CPU cycles during the period of time in which the application is paused. When the single central native timer is re-created, threads in a wait state that come out of the wait (i.e., the wait finishes) can start to run again.

Figure 2:
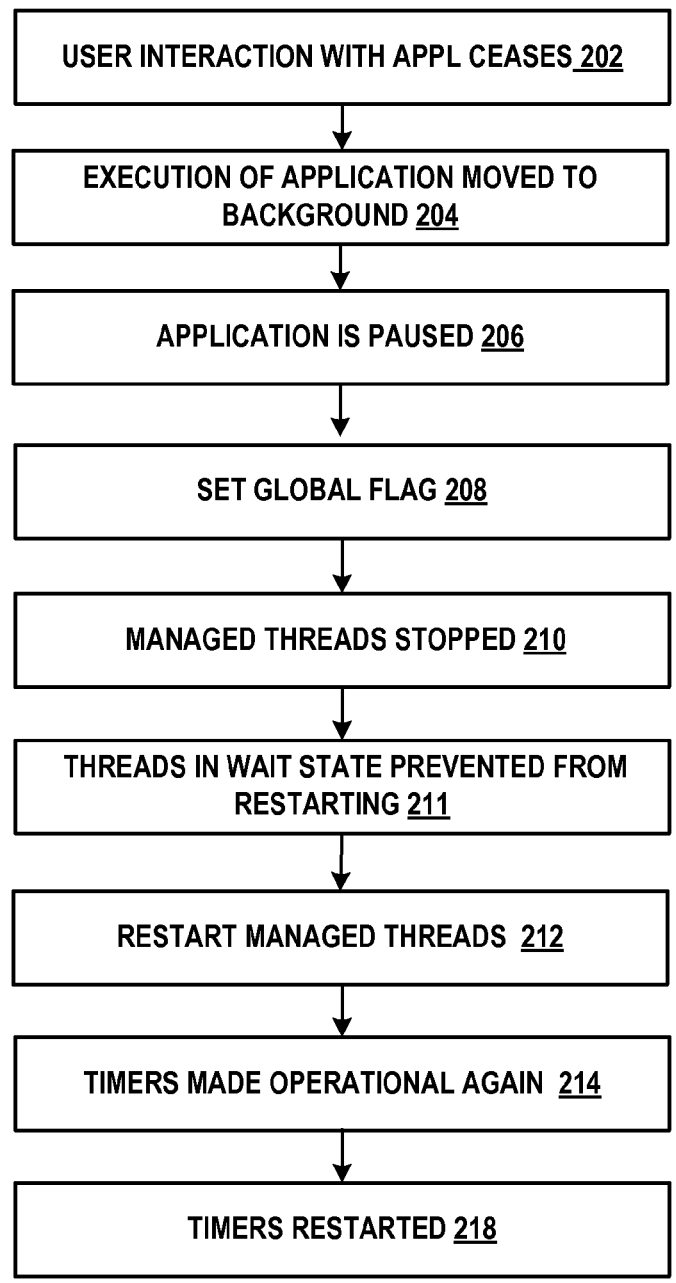
FIG. 2 illustrates an example of a method 200 for pausing and resuming an application in accordance with aspects of the subject matter disclosed herein.

FIG. 2 illustrates a method 200 that can pause and resume an application in accordance with aspects of the subject matter described herein. The method described in FIG. 2 can be practiced by a system such as but not limited to the one described with respect to FIGS. 1a and 1b. While method 200 describes a series of operations that are performed in a sequence, it is to be understood that method 200 is not limited by the order of the sequence. For instance, some operations may occur in a different order than that described. In addition, one operation may occur concurrently with another operation. In some instances, not all operations described are performed. When a thread of an executing application requests a wait, a flag can be set so that the thread is in an alertable wait state. At operation 202 user interaction with the application ceases. At operation 204 execution of the application is moved from foreground to background. The application is not unloaded from memory. Application state is saved. The application state can be saved in isolated storage or in any suitable way. At 206 the application is paused. A global resume event can be created and set to an unsignaled state.

At 208 a global flag can be set to indicate that the application has been paused. This flag is used later to ensure that no waiting threads start to run. At 210 all executing managed threads of the paused application can be stopped at a safe place essentially simultaneously. Threads that are in a wait state can be prevented from starting to run again at 211. Native code that attempts to return to managed code is blocked. The time at which the pause occurred can be recorded so that timers can be recalculated after the application resumes. All the threads are iterated through. For each thread that is in a wait state indicated by the having the alertable wait state flag set, an APC call is queued to the thread. The OS wakes up the thread, and executes the APC call, which is blocked until a resume event occurs.

At 212 in response to resuming the application, all the managed threads can be restarted. At 214 timers can be made operational again (e.g., by creating a new central native timer). At 218 timers can be restarted, enabling native threads to resume execution.

Example of a Suitable Computing Environment

Figure 3:
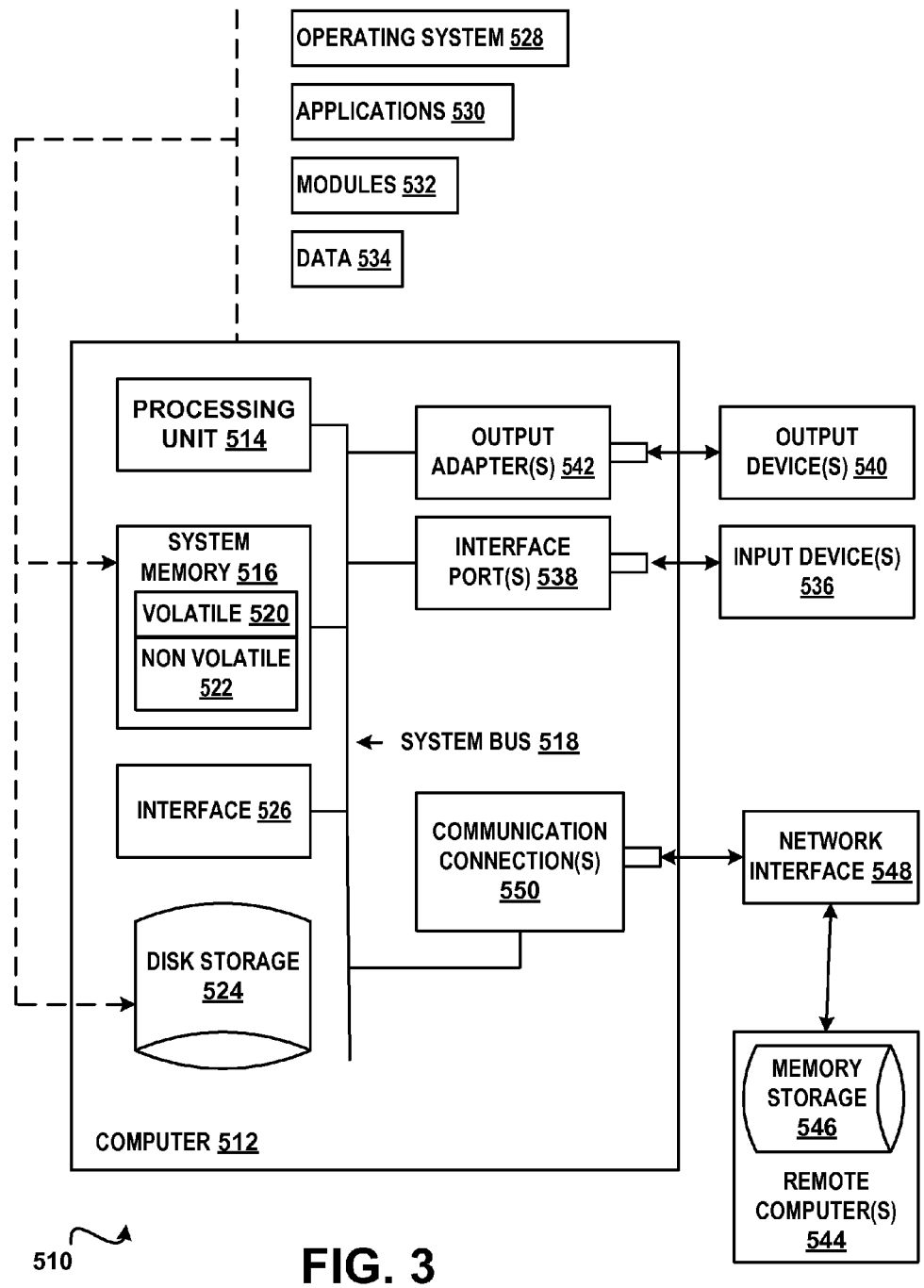
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory, Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include transitory media such as, but not limited to, communications signals, modulated carrier waves or any other transitory media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input device(s) 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices (s) 540 may use the same type of ports as do the input devices. Output adapter(s) 542 is provided to illustrate that there are some output device(s) 540 like monitors, speakers and printers that require particular adapters. Output adapter(s) 542 include but are not limited to video and sound cards that provide a connection between the output device(s) 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer(s) 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
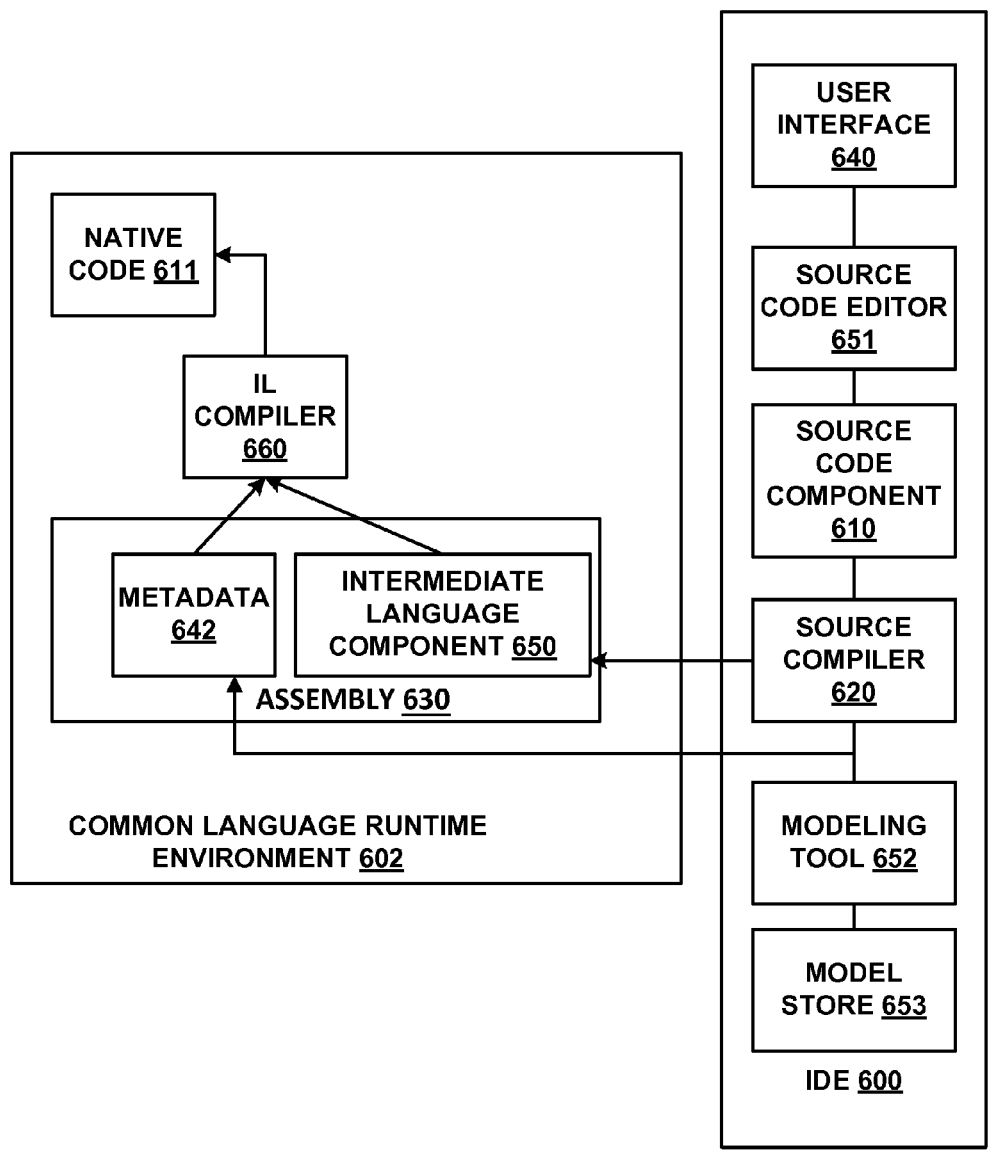
FIG. 4 is a block diagram of an example of an integrated development environment (IDE) in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++, C#, J#, Java Script, APL, COBOL, Pascal, Eiffel, Haskell, M L, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the Microsoft .NET™ framework. An intermediate language component 650 may be created from the source code component 610 and the native code component 611 using a language specific source compiler 620 using a modeling tool 652 and model store 653 and the native code component 611 (e.g., machine executable instructions) is created from the intermediate language component 650 using the intermediate language compiler 660 (e.g. just-in-time (JIT) compiler), when the application is executed. That is, when an intermediate language (IL) application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor of a computing device;
   a memory of the computing device; and
   a program execution manager loaded into the memory causing the at least one processor to:
   utilize no CPU cycles when an application is paused by:
     in response to execution of a pause handler, stopping all executing threads of the paused application and preventing all threads of the paused application that are in a wait state from starting to run; and
     using asynchronous procedure calls to prevent native code from using CPU cycles while the application is paused;
   adjust remaining times of waits in the threads that are in a wait state to provide adjusted remaining times to account for a duration of a pause in which the application is paused; and
   restart the waits to have the adjusted remaining times.

2. The system of claim 1, further comprising at least one module that when loaded into the memory causes the at least one processor to:
   queue an asynchronous procedure call (APC) to a waiting thread of the paused application; and
   wake the waiting thread and cause the woken thread to call into the queued APC function, wherein the APC function is blocked until the paused application is resumed.

3. The system of claim 1, wherein the application is moved to background in response to user interaction ceasing.

4. The system of claim 1, further comprising setting a global flag indicating that the application is in a paused state.

5. A method comprising:
   utilizing no CPU cycles by an application executing on a computing device when the application is in a paused state by:
     in response to execution of a pause handler, stopping all executing threads of the paused application and preventing all threads of the paused application that are in a wait state from starting to run; and
     using asynchronous procedure calls to prevent native code from using CPU cycles while the application is in the paused state;
   adjusting remaining times of waits in the threads that are in a wait state to provide adjusted remaining times to account for a duration of the paused state; and
   restarting the waits to have the adjusted remaining times.

6. The method of claim 5, wherein a global static flag is set.

7. The method of claim 5, wherein each time a handle times out a flag indicating a pause state of the application is checked.

8. The method of claim 7, wherein in response to determining the application is paused, a resume event is blocked.

9. The method of claim 8, wherein the resume event is implemented using a wait function that waits for a single handle and has an infinite timeout duration.

10. A computer-readable storage medium comprising computer-executable instructions which when executed cause at least one processor of a computing device to:
    in response to ceasing to receive user interaction with an application executing on the at least one processor of the computing device, move the application from foreground to background and pause the application;
    execute a pause handler, the pause comprising a pausing stage and a freeze stage, the paused application using no CPU cycles by:
      stopping all user managed code from executing; and
      preventing native code from executing by using asynchronous procedure calls;
    adjust remaining times of waits in threads of the paused application that are in a wait state to provide adjusted remaining times to account for a duration of the pause; and
    restart the waits to have the adjusted remaining times.

11. The computer-readable storage medium of claim 10, comprising further computer-executable instructions, which when executed cause the at least one processor to:
    set a global flag.

12. The computer-readable storage medium of claim 11, comprising further computer-executable instructions, which when executed cause the at least one processor to:
  queue an asynchronous procedure call (APC) to a waiting thread of the paused application; and
  wake the waiting thread and cause the woken thread to call into the queued APC function, wherein the APC function is blocked until the paused application is resumed.

13. The computer-readable storage medium of claim 11, comprising further computer-executable instructions, which when executed cause the at least one processor to:
  check a state of the application whenever a handle used by the application times out.

14. The computer-readable storage medium of claim 11, comprising further computer-executable instructions, which when executed cause the at least one processor to:
  block a resume event in response to determining the application is paused.

15. The system of claim 1, wherein the program execution manager further causes the at least one processor to:
  check a state of the application whenever a handle used by the application times out; and
  block a resume event in response to a determination that the application is paused.

16. The system of claim 15, wherein the resume event is implemented using a wait function that waits for a single handle and has an infinite timeout duration.

17. The method of claim 5, further comprising:
  queuing an asynchronous procedure call (APC) to a waiting thread of the paused application; and
  wake the waiting thread and cause the woken thread to call into the queued APC function, wherein the APC function is blocked until the paused application is resumed.

18. The method of claim 5, further comprising:
  in response to ceasing to receive user interaction with the application, moving the application from foreground to background and causing the application to be in the paused state.

19. The method of claim 5, further comprising:
  setting a global flag indicating that the application is in the paused state.

20. The computer-readable storage medium of claim 14, wherein the resume event is implemented using a wait function that waits for a single handle and has an infinite timeout duration.

* * * * *